United States Patent [19]
Thurlow et al.

[11] 3,729,626
[45] Apr. 24, 1973

[54] INSTRUMENT LIGHTING SYSTEM WITH INWARD ILLUMINATION OF THE DISPLAY AND OUTWARD ILLUMINATION OF NOMENCLATURE AND INDEX MARKS

[75] Inventors: Wallace Thurlow, Newburyport; Louis S. Trapasso, Winthrop, both of Mass.

[73] Assignee: General Electric Company, Wilmington, Mass.

[22] Filed: Aug. 26, 1971

[21] Appl. No.: 175,215

[52] U.S. Cl. ..............................240/1 EL, 240/8.16
[51] Int. Cl. ....................................................F21
[58] Field of Search ..........................240/8.16, 1 EL

[56] References Cited

UNITED STATES PATENTS

| 3,263,646 | 8/1966 | Arnold et al. | 240/8.16 X |
| 3,029,334 | 4/1962 | Anderson et al. | 240/1 EL |
| 2,907,869 | 10/1959 | Hudson et al. | 240/1 EL |

*Primary Examiner*—Samuel S. Matthews
*Assistant Examiner*—Richard A. Wintercorn
*Attorney*—I. David Blumefeld

[57] ABSTRACT

An illuminating system for an instrument having a display formed of a plurality of rotatable indicator wheels includes a glass wedge and lamps mounted in the wedge provide rearward illumination of the wheel display through internal reflection of the light in the wedge. A metallic shield having suitable openings to permit display of the illuminated counter wheels is positioned in front of the wedge to minimize glare by blocking at least part of the light projected in the forward direction. In addition, the shield is so configured that a portion of the normally useless forwardly projected light is utilized to illuminate certain indices on the plate such as decimal points and the like. To this end, nomenclature marks such as those identifying the parameter being measured, or index marks such as decimal points, hyphens, etc. are punched through the light shield and suitable diffusers/filters are positioned between the light wedge and these openings to permit illumination of the desired nomenclature and/or index marks by light projected in the forward direction. In this fashion, these elements are illuminated at varying degrees of intensity and/or color by light rays which normally represents lost or stray light, while at the same time, minimizing glare by blocking or elimination the bulk of the stray light from being projected outwardly toward the viewer.

9 Claims, 4 Drawing Figures

Patented April 24, 1973 3,729,626

INVENTORS
WALLACE W. THURLOW
LOUIS S. TRAPASSO
BY
David Blumenfeld
ATTORNEY

INSTRUMENT LIGHTING SYSTEM WITH INWARD ILLUMINATION OF THE DISPLAY AND OUTWARD ILLUMINATION OF NOMENCLATURE AND INDEX MARKS

This invention relates to an instrument lighting system, and more particularly, to a wedge lighting system in which glare is minimized due to forwardly projected light while making use of a portion of this normally stray light to illuminate certain instrument markings.

Wedge lighting systems for illuminating instrument displays are well known in the art and incorporate a transparent wedge shaped body which is positioned in front of a display such as an aircraft instrument dial either of the pointer or of the wheel counter type. A light source is positioned above or in the wide or thick portion of the wedge and the wedges are so configured that multiple internal reflections of the light cause it to emerge from the interior or rear face of the wedge to illuminate the instrument display.

A certain fraction of the light, however, in undergoing the multiple internal reflections, emerges from the front face of the wedge in a direction away from the instrument display. This fraction of the light not only represents a light loss in that it does not illuminate the display and thus serves no useful purpose, but actually causes glare which is highly annoying to the observer, particularly where a great number of such instruments may be mounted in a small space as is often the case in the cockpit of an aircraft. Hitherto, it has been proposed to eliminate the glare, at least partially, by utilizing a second wedge positioned adjacent to the first wedge with the apex of the second wedge being placed adjacent to the base of the first wedge. Thus, light which emerges from the first wedge in the forward direction strikes the second wedge and because of refraction will undergo multiple internal reflections in the second wedge and is either trapped or utilized to illuminate another display. Typical of such prior art approaches are the systems described and shown in U.S. Pat. No. 3,040,168, 2,646,637, 2,761,056 and the like.

It will be obvious, however, that the double wedge configurations for illuminating a display while effective in reducing glare, requires the use of an additional wedge which represents additional cost, weight and space, as well as additional complexity in manufacturing and assembly. Consequently, a need exists for an illumination system for an instrument which eliminates or minimizes glare, while yet avoiding the need for additional wedge elements which add costs and complexity to the device. Furthermore, it would also be highly desirable to provide a wedge illuminating system in which the glare is substantially eliminated, while at the same time, selectively using portions of the forward projected light for useful purposes. To this end, applicant has developed a system in which the forwardly projected light from a single wedge is blocked by a suitable shielding means to eliminate a substantial amount of glare, while at the same time, selected portions of the forwardly projected light are utilized to illuminate nomenclature markings and indices on the instrument face or shield with the illumination to the nomenclature and indices being controlled in intensity and color by means of suitable filters and diffusers.

It is therefore, a principal objective of the instant invention to provide a wedge lighting illumination system in which glare is minimized and the normally undesirable forwardly projected light is selectively utilized to illuminate nomenclature and index markings.

Another objective of the invention is to provide an instrument illumination system of the wedge type which minimizes glare and provides selective illumination of nomenclature and indices which is light in weight, low in cost and easy to manufacture.

Other objectives and advantages of the instant invention will become apparent as the description thereof proceeds.

In carrying out the invention and realizing the various objectives, an instrument illumination system is provided in which a single wedge lighting element is positioned adjacent to a counter wheel display of an instrument. A plurality of lamps are positioned within the thick portion of the wedge with the light from the lamps being reflected internally so that light is emitted inwardly to illuminate the display. Positioned on the other side of the wedge is a suitable shield member which contains a plurality of openings to permit display of the numbers or indicating marks on the counter wheel. The shield is also provided with selected nomenclature and index marks in the form of openings in the shield. Light from the wedge is emitted in the forward direction projects through these openings. One or more filter and diffusing means which control the intensity and/or color of the illumination field are positioned between the nomenclature and index openings and the wedge. In this manner, a substantial portion of the forwardly projected light, which normally constitutes objectionable glare, is blocked by the shield, while selected portions thereof are permitted to pass through the nomenclature and index openings to provide illumination of these marks and thereby serve a useful function.

The novel features which are believed to be characteristic of this invention are set forth with particularity in the appended claims. The invention itself, however, as to its organization and method of operation, may be best understood by reference to the following description taken in connection with the accompanying drawings in which:

Figures 1, 2, 3, 4:
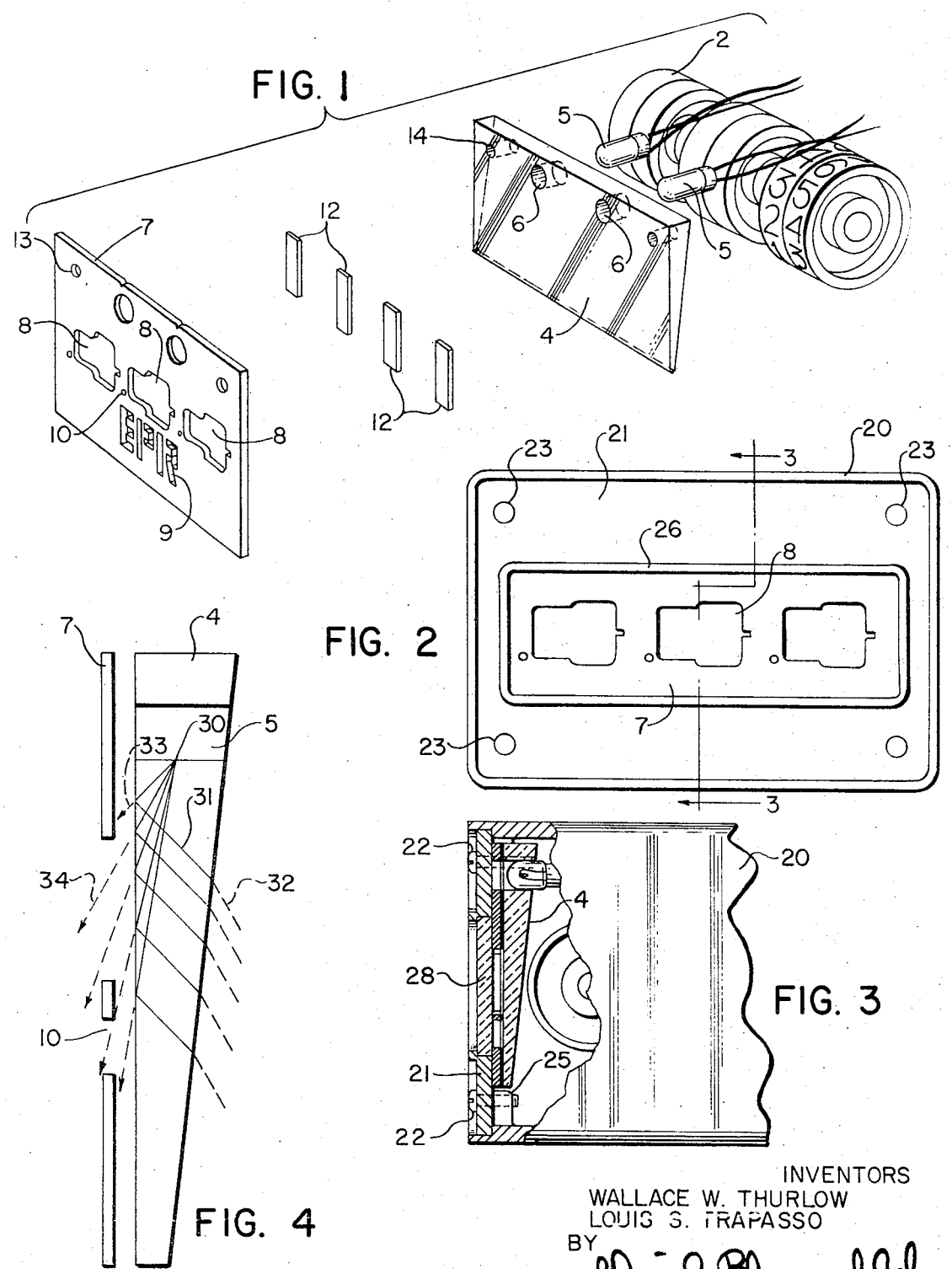
FIG. 1 is an exploded, perspective view of the illuminating system and the display wheel counters constituting the display.
FIG. 2 is an elevational view of the instrument.
FIG. 3 is a partially broken away section taken along the lines 3—3 of FIG. 2.
FIG. 4 is a schematic diagram of a lighting wedge illustrating the light ray paths.

FIG. 1 shows an exploded, perspective view of a wedge lighting arrangement 1 positioned in front of an instrument display which in this instance, includes a plurality of rotatable counter wheels 2. The counter wheels are actuated by any suitable mechanism such as electromagnetic actuators, for example, in response to the parameter to be measured. The instrument lighting system includes a light distributing glass wedge 4 positioned directly in front of the wheel counters. A plurality of light sources such as the bulbs 5, are positioned at the base or thick portion of the wedge. The bulbs, which may be energized in any suitable manner, are shown mounted in openings 6 in the base of the wedge although other mounting arrangements for the bulbs are equally feasible. The light from the bulbs enters the wedge 4 and by means of multiple internal reflections the major portion of the light emerges from the rear face of the wedge and provides rearward illumination of counter wheels.

Positioned in front of the glass wedge is an arrangement for controlling transmission of the light energizing from the front face of wedge 4 to minimize glare and for utilizing a portion of this light to illuminate certain markings and indices on the instrument face. To this end, a metallic shield 7 is provided which contains a plurality of openings 8 for permitting display of the counter wheels. In addition to a number of light transmitting, nomenclature or index markings are provided in the form of openings extend entirely through the shield. Thus, for example, suitable nomenclature mark describing the parameter being measured, such as the designation EPR (representing engine pressure ratio), indicated generally at 9, is punched or stamped or otherwise extends through the shield. Similarly, indices such as decimal points 10 or an interpolation mark such as the dash 11 project through the shield so that forwardly projected light from the wedge passes through and illuminates these openings. In this fashion, a portion of the normally useless forwardly emitted light serves a useful purpose.

Positioned between the shield and the glass wedge are a plurality of filter/diffuser elements 12 which are selectively positioned between wedge 4 and the nomenclature or index openings 9, 10 and 11. In FIG. 1, the filter/diffuser elements 12 are shown schematically. It will be understood that these are of the proper configuration and are suitably positioned to overlie the nomenclature and index openings at 9, 10 and 11. The filter/diffuser elements are suitably fastened to the back of the shield plate 7 by any commercially available adhesive and cover the openings so that the forwardly emitted light from wedge 4 is transmitted through these elements to control both in the intensity of the illumination of these openings as well as the color, if that is desired. Thus, these filter/diffuser elements may, in a preferred embodiment, [where only simple illumination of the nomenclature, index or interpolation marks is desired] constitute transparent plastic members having white paint sprayed thereon. The density and amount of paint on the surface of the device will obviously control the intensity of the transmitted light. In addition to controlling the intensity of the forward illumination and hence, the brightness of the marks and indices, the elements 12 may be of the type to produce selective spectral illumination of these openings. Thus, if a red filter element is utilized, thereby passing only light in the red portion of the spectrum, the marks will be illuminated by red light. Similarly, other filters may be used to provide any desired color.

The entire lighting assembly, wedges, shield, etc. is fastened by suitable fastening means through openings 13 and 14 in the shield and wedge member 4 to the instrument housing, not shown.

FIGS. 2 and 3 illustrate the instrument wedge lighting arrangement of the invention mounted in an instrument housing. The wedge lighting system is mounted in instrument housing 20 and is secured to face plate 21 and the housing by a plurality of fastening means such as the screws 22 which pass through mounting holes 23 in the face plate. These mounting holes align with mounting holes 13 and 14 in shield 7, and light wedge 4 respectively. The screws 22 are fastened to a rib or mounting flange 25 (which may be seen most clearly in FIG. 3) in the interior of the housing thereby firmly securing the entire assembly in the instrument housing.

Face plate 21 has an opening 26 through which the shield member 7 and the counter wheels 2 are visible. The opening is sufficiently large to expose display openings 8 in shield 7 as well as the nomenclature marks, namely the letters EPR representing engine pressure ratio, the decimal points 10 and the interpolation mark 11 to view. These marks 9, 10 and 11, as pointed out previously, are illuminated by a portion of the forward projected light from the lighting system while the remaining forwardly projected light is blocked by shield 7. Also, positioned within the opening 26 of the shield is a pane of transparent material 28 which may be either glass or the like which covers and protects shield 7. The bulbs which constitute the source of illumination for the wedge lighting system are, as shown in FIG. 3, positioned in openings 6 in glass wedge 4. Counter wheels 2 which constitute the display of the instrument are positioned directly behind the wedge so that major portion of the light from bulbs is internally reflected and emerges from the rear of the wedge to illuminate the counter wheels.

FIG. 4 illustrates schematically the light distribution within the wedge and the manner in which the shield 7 blocks a portion of the forwardly projected light from the wedge to block the major part of this light to minimize glare while selectively utilizing a portion of this forwardly projected light to illuminate nomenclature, index or interpolation mark in the shield. FIG. 4 is highly exaggerated in size and idealized in form in order to illustrate the principles rather than the actual constructional details. For one thing, the filter/diffuser elements 12 shown in FIG. 1 have, for the sake of simplicity of illustration, not been illustrated in FIG. 4. Only the wedge and the shield and the openings 9, 10 and 11, the size of which has been exaggerated for emphasis, are shown in FIG. 4. Furthermore, the light source such as the bulbs 6 which project to the openings 5 in the wedge has not been shown in order to simplify the drawing. Thus, a single point source of light 30, which represents the plurality of light sources which are actually represented by the bulb is shown at the surface of wedge opening 5. The light rays 31 enter the wedge and are initially totally reflected from the opposing surfaces of the wedge since they strike the surfaces at an angle which is greater than the critical angle of total reflection. As a result, multiple total reflections from the inner surfaces occur. After the initial reflections, the light rays will eventually achieve an angle with respect to these surfaces which is less than the critical angle of total reflection and more and more of the light rays emerge as shown at 32 in the rearward direction to illuminate the counter wheels. However, not all of the rays are totally reflected at the interior surface and a number of these indicated by the dashed lines 33 emit from the forward surface of the wedge and therefore, represent forward illumination which normally represents glare from the instrument face.

However, due to the presence of the shield 7, substantial portions of this forward illumination is blocked by the shield and prevented from being emitted into the cockpit as a form of the glare. Selected light rays shown generally by the dashed lines 34 however, are projected through openings 9, 10 and 11 representing index, interpolation and nomenclature marks and serve to illuminate these marks. In this manner, a portion of the forwardly projected light which is normally present as undesirable glare performs a useful function in illuminating the various marks or indices on the instrument plate. The remaining forwardly projected light is effectively blocked by the shield therefore minimizing the glare from the instrument case.

It will be appreciated from FIG. 4 that the light ray distribution shows highly simplistic version of what occurs. Only a single reflection of the light is shown for simplicity of illustration. It will be further understood that a multiplicity of such internal reflections take place before the light rays impinging on the sides of the wedge reach an angle which is less than the critical angle of total reflection and are emitted both in the forward and rearward direction. However, the schematic of FIG. 4 is adequate in illustrating the relative distribution of both the forward and rearward emitter light and the manner in which the forward emitted light is blocked by the shield and only a selected portion thereof passes through the openings in the shield to illuminate the indices, nomenclatures etc.

It can be seen from the foregoing description that a simple and effective wedge lighting assembly has been provided in which forwardly emitted light from the lighting system is blocked except for the selected portions thereof that are utilized to illuminate the various marks on the instrument face. In this manner, glare is minimized, illumination of indices and other marks is provided, while at the same time, providing a simple arrangement in which this is achieved without the use of other matching and expensive wedge elements for a light distribution arrangement.

Although one particular embodiment of the invention has been shown and described above, it will, of course, be understood that the invention is not limited thereto since many modifications in the structure and arrangement may be made. It is contemplated by the appended claims, any such modifications as forwarded in the true spirit and scope of this invention.

What is claimed as new and desired to be secured by Letters Patent of the United States:

1. In a lighting system for illuminating an instrument display the combination comprising
   a. an instrument display,
   b. a transparent wedge shaped body positioned in front of said display for illuminating said display by light emitted rearwardly from said wedge after multiple internal reflections,
   c. a light source so positioned with respect to the thick portion of the wedge for introducing light into the wedge,
   d. means for controlling transmission of light emitted frontwardly from said wedge to minimize glare and utilize selected portions thereof to illuminate selected marking on the instrument face, including
   e. shielding means positioned in front of said wedge to block forwardly emitted light from said wedge, said shielding means including means defining display openings extending therethrough and aligned with said display, and further opening means extending through said shield representing index or nomenclature marks so that a portion of the forwardly emitted light is transmitted through said further openings to illuminate said marks with forwardly emitted light.
   f. At least one light transmission control element positioned between the wedge and said further openings to control the characteristics of the light transmitted through the further openings and the illumination of the marks represented thereby.

2. The lighting system according to claim 1 wherein said display means comprises a plurality of counter wheels and said display opening includes a plurality of openings aligned with said plurality of wheels.

3. The lighting system according to claim 1 wherein said wedge includes opening means extending through the thick portion of the wedge and said light source is positioned in the opening in the wedge.

4. The lighting system according to claim 1 in which the light transmission control element controls the intensity of the light transmitted through the further openings.

5. The lighting system according to claim 1 in which the light transmission control element controls the spectral characteristic of the light transmitted through the further openings.

6. The lighting system according to claim 1 in which the light transmission control element controls both the intensity and spectral characteristic of the light transmitted through the further openings.

7. The lighting system according to claim 2 including light transmission control elements positioned between the wedge and said further openings to control the characteristics of the light transmitted therethrough.

8. The lighting system according to claim 7 wherein said further openings represent nomenclature marks identifying the parameter being measured.

9. The lighting system according to claim 8 wherein said further openings also include further indeces.

* * * * *